(12) United States Patent
Hirano et al.

(10) Patent No.: US 12,264,925 B2
(45) Date of Patent: Apr. 1, 2025

(54) ROUTE DETERMINATION DEVICE AND VEHICLE DISPATCH SYSTEM

(71) Applicant: TOYOTA JIDOSHA KABUSHIKI KAISHA, Toyota (JP)

(72) Inventors: Takahiro Hirano, Gotemba (JP); Shogo Tsuge, Fuji (JP); Ryosuke Ikemura, Susono (JP); Yohei Arino, Nagoya (JP); Masaki Ito, Toyota (JP); Yuki Takahashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 17/864,787

(22) Filed: Jul. 14, 2022

(65) Prior Publication Data

US 2023/0022823 A1    Jan. 26, 2023

(30) Foreign Application Priority Data

Jul. 26, 2021   (JP) ................................ 2021-121627

(51) Int. Cl.
*G01C 21/34* (2006.01)
*G01C 21/36* (2006.01)

(52) U.S. Cl.
CPC ..... *G01C 21/3469* (2013.01); *G01C 21/3415* (2013.01); *G01C 21/3697* (2013.01)

(58) Field of Classification Search
CPC ............ G01C 21/3469; G01C 21/3415; G01C 21/3697; G01C 21/3438; G08G 1/096816; G08G 1/096844; G08G 1/202; Y02T 10/70
See application file for complete search history.

(56) References Cited

U.S. PATENT DOCUMENTS

| 9,545,854 | B2 * | 1/2017 | Daum | ..................... B60L 55/00 |
| 10,525,848 | B2 * | 1/2020 | Nelson | ............... G01C 21/3415 |
| 2022/0341744 | A1 * | 10/2022 | Zhang | .................... G06Q 10/02 |

FOREIGN PATENT DOCUMENTS

| JP | 2012-047670 | 3/2012 |
| JP | 2013-069226 | 4/2013 |
| WO | WO 2019/225046 | 11/2019 |

* cited by examiner

*Primary Examiner* — Donald J Wallace
*Assistant Examiner* — Ashley Brown Raynal
(74) *Attorney, Agent, or Firm* — Finnegan, Henderson, Farabow, Garrett and Dunper LLP

(57) ABSTRACT

A server includes a communication device and a processor. From a user terminal, the communication device acquires a vehicle dispatch request including information indicating a vehicle dispatch location and a destination of a vehicle. When the communication device acquires the vehicle dispatch request, the processor determines a traveling route of the vehicle from a current location of the vehicle to the destination via the vehicle dispatch location in accordance with the vehicle dispatch request. The processor determines a route from the current location to the vehicle dispatch location such that an amount of power storage in a power storage device at the vehicle dispatch location is larger than an amount of electric power with which the vehicle can travel from the vehicle dispatch location to the destination.

6 Claims, 6 Drawing Sheets

ROUTE DETERMINATION DEVICE AND VEHICLE DISPATCH SYSTEM

This nonprovisional application is based on Japanese Patent Application No. 2021-121627 filed on Jul. 26, 2021 with the Japan Patent Office, the entire contents of which are hereby incorporated by reference.

BACKGROUND

Field

The present disclosure relates to a route determination device and a vehicle dispatch system.

Description of the Background Art

International Publication No. 2019/225046 discloses a vehicle dispatch device that performs a route searching process for a vehicle in order to dispatch a vehicle to a user. This route searching process is performed for searching for a traveling route of a vehicle from the current location of the vehicle via a user pickup position (a vehicle dispatch location) to a destination of the user. When an electrically powered vehicle such as a battery electric vehicle (BEV) is included in candidate vehicles each as a candidate for a vehicle to be dispatched to a user, the vehicle dispatch device determines whether or not to designate the electrically powered vehicle as a candidate vehicle, based on the remaining battery capacity of the electrically powered vehicle and the amount of power consumption required for the electrically powered vehicle to travel along the above-mentioned traveling route.

SUMMARY

According to the above-mentioned International Publication No. 2019/225046, when a user requests dispatch of a vehicle, an electrically powered vehicle in which the amount of power storage in a power storage device for traveling is less than the above-mentioned amount of power consumption may be excluded from candidate vehicles. As the number of electrically powered vehicles excluded from the candidate vehicles is larger, a range for selection of the electrically powered vehicles that can be dispatched to a user becomes narrower. As a result, the vehicle dispatch efficiency decreases.

The present disclosure has been made to solve the above-described problems, and an object of the present disclosure is to provide a route determination device and a vehicle dispatch system that are capable of improving the vehicle dispatch efficiency for an electrically powered vehicle when a user requests dispatch of a vehicle.

A route determination device of the present disclosure determines a route of a vehicle that travels using electric power stored in a power storage device. The route determination device includes an acquisition device and a processor. From a user terminal, the acquisition device acquires a vehicle dispatch request including information indicating a vehicle dispatch location and a destination of the vehicle. When the acquisition device acquires the vehicle dispatch request, the processor determines a traveling route of the vehicle from a current location of the vehicle via the vehicle dispatch location to the destination in accordance with the vehicle dispatch request. Then, the processor determines a vehicle dispatch route of the vehicle from the current location to the vehicle dispatch location such that an amount of power storage in the power storage device at the vehicle dispatch location is larger than an amount of electric power with which the vehicle is capable of traveling from the vehicle dispatch location to the destination.

According to the configuration as described above, even when the amount of power storage in the power storage device is low, the vehicle can travel to the destination without requiring charging of the power storage device in the middle of the route from the vehicle dispatch location to the destination after it arrives at the vehicle dispatch location via the vehicle dispatch route. This avoids such a situation that the vehicle is excluded from the candidate vehicles. Therefore, the vehicle dispatch efficiency can be improved when the user requests dispatch of a vehicle.

The vehicle may include a power reception device that wirelessly receives electric power from a power transmission device installed in a charging lane while the vehicle travels on the charging lane, and electric power received by the power reception device may be stored in the power storage device. The processor may determine the vehicle dispatch route such that the vehicle dispatch route includes a route on which the charging lane is installed.

According to the configuration as described above, the power storage device is charged while the vehicle travels on the charging lane in the vehicle dispatch route. This eliminates the need for the vehicle to stop for the purpose of using a charging facility such as a charging station in the middle of the route from the current location to the vehicle dispatch location. Thus, the vehicle can arrive at the vehicle dispatch location earlier than when the vehicle uses a charging facility such as a charging station.

The processor may determine the vehicle dispatch route such that power reception efficiency of the power reception device that is achieved when electric power received by the power reception device is stored in the power storage device is equal to or greater than a threshold efficiency.

The configuration as described above can avoid such a situation that the vehicle travels on the charging lane that unnecessarily lowers the power reception efficiency of the power reception device.

The processor may perform a process for giving an incentive point to a user of the vehicle when the power reception device receives electric power generated using renewable energy from the power transmission device.

According to the configuration as described above, the user can be motivated to use renewable energy.

When the acquisition device acquires the vehicle dispatch request, the processor may determine the traveling route in accordance with the vehicle dispatch request and estimate the amount of power storage at the vehicle dispatch location and the amount of electric power. Then, when the estimated amount of power storage is smaller than the estimated amount of electric power, the processor may modify the vehicle dispatch route such that the amount of power storage at the vehicle dispatch location is larger than the amount of electric power.

According to the configuration as described above, even when the amount of power storage in the power storage device is low at the point in time when the acquisition device acquires the vehicle dispatch request, the amount of power storage at the vehicle dispatch location can be set to be larger than the amount of electric power with which the vehicle can travel from the vehicle dispatch location to the destination. Therefore, the vehicle can travel to the destination without requiring charging of the power storage device in the middle of the route from the vehicle dispatch location to the destination.

The vehicle may be capable of unmanned traveling. The processor may determine the vehicle dispatch route such that the amount of power storage at the vehicle dispatch location is larger than the amount of electric power when the vehicle performs unmanned traveling from the current location to the vehicle dispatch location.

During unmanned driving of the vehicle, no problem arises in drivability of the vehicle. Thus, according to the configuration as described above, the processor can determine the vehicle dispatch route irrespective of whether the drivability is excellent or not. This avoids such a situation that a range for selection of the vehicle dispatch route is narrowed for prevention of deterioration in drivability.

The processor may estimate an amount of power consumption in the power storage device that is consumed during traveling of the vehicle on the vehicle dispatch route, in accordance with gradient information indicating gradients of roads in the vehicle dispatch route. Then, the processor may estimate an amount of power storage in the power storage device at the vehicle dispatch location in accordance with the estimated amount of power consumption and an amount of power storage in the power storage device at the current location.

When the vehicle travels on a road with a relatively gradual uphill gradient, the amount of power consumption in the power storage device is smaller than that consumed when the vehicle travels on a road with a relatively steep uphill gradient. Thus, according to the configuration as described above, the vehicle dispatch route is determined such that the vehicle dispatch route includes the road with a relatively gradual uphill gradient in preference to the road with a relatively steep uphill gradient. This suppresses the amount of power consumption in the power storage device that is consumed during traveling of the vehicle on the vehicle dispatch route, and thereby, the amount of power storage in the power storage device at the vehicle dispatch location can be high. Therefore, the vehicle can travel to the destination without requiring charging of the power storage device in the middle of the route from the vehicle dispatch location to the destination.

A vehicle dispatch system of the present disclosure includes a vehicle and a server. The vehicle travels using electric power stored in a power storage device. The server communicates with the vehicle and dispatches the vehicle. The server includes an acquisition device and a processor. From a user terminal, the acquisition device acquires a vehicle dispatch request including information indicating a vehicle dispatch location and a destination of the vehicle. When the acquisition device acquires the vehicle dispatch request, the processor determines a traveling route of the vehicle from a current location of the vehicle via the vehicle dispatch location to the destination in accordance with the vehicle dispatch request. Then, the processor determines a vehicle dispatch route of the vehicle from the current location to the vehicle dispatch location such that an amount of power storage in the power storage device at the vehicle dispatch location is larger than an amount of electric power with which the vehicle is capable of traveling from the vehicle dispatch location to the destination.

According to the configuration as described above, even when the amount of power storage in the power storage device is low, the vehicle can travel to the destination without requiring charging of the power storage device in the middle of the route from the vehicle dispatch location to the destination after it arrives at the vehicle dispatch location via the vehicle dispatch route. This avoids such a situation that the vehicle is excluded from candidate vehicles. Therefore, the vehicle dispatch efficiency can be improved when the user requests dispatch of a vehicle.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
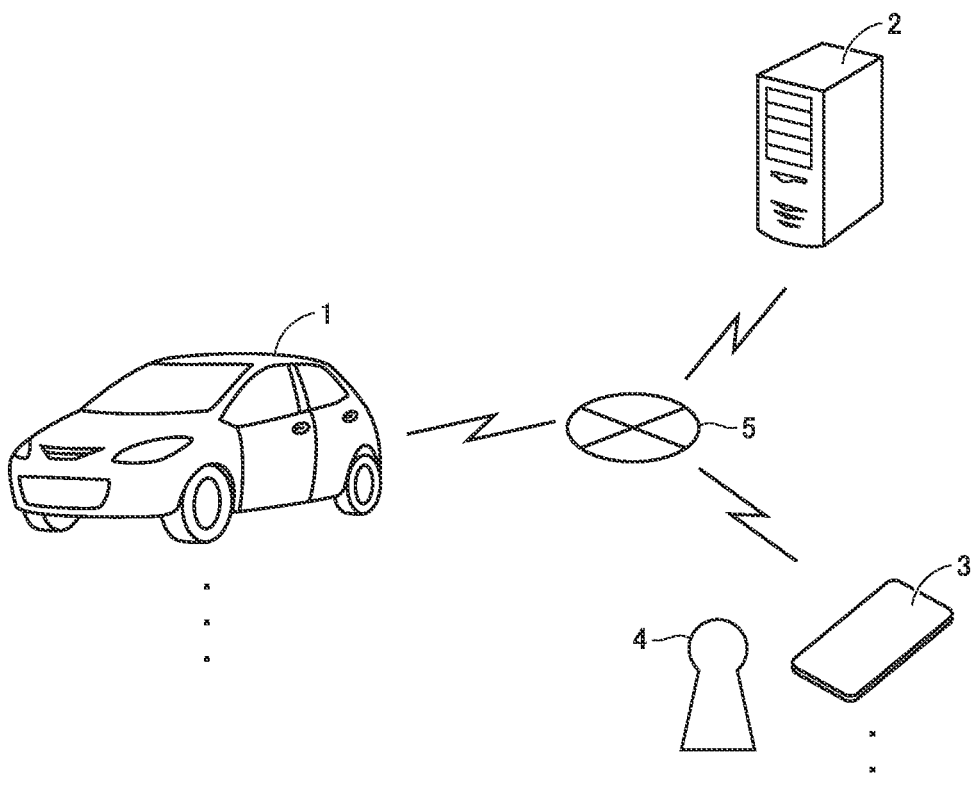
FIG. 1 is a diagram schematically showing an overall configuration of a vehicle dispatch system including a server as a traveling route determination device according to an embodiment of the present disclosure.

Embodiments of the present disclosure will be hereinafter described in detail with reference to the accompanying drawings, in which the same or corresponding components are denoted by the same reference characters, and description thereof will not be repeated.

Embodiments

FIG. 1 is a diagram schematically showing an overall configuration of a vehicle dispatch system including a server as a traveling route determination device according to an embodiment of the present disclosure. A vehicle dispatch system 100 includes a plurality of vehicles 1, a server 2, and a user terminal 3. Vehicle 1, server 2, and user terminal 3 are configured to be capable of bidirectionally communicating with each other through a network 5 such as the Internet.

Each vehicle 1 is an electrically powered vehicle on which a power storage device is mounted. Each vehicle 1, which travels using electric power stored in the power storage device, is a battery electric vehicle (BEV), for example.

In the present embodiment, vehicle 1 is configured to be capable of unmanned driving. The unmanned driving is an automated driving in the state in which no person rides in vehicle 1. In vehicle 1, unmanned driving may not necessarily have to be performed but manned driving may be performed.

Server 2 is configured to determine a traveling route of vehicle 1 when it acquires a vehicle dispatch request indicating that a user 4 requests dispatch of vehicle 1. Server 2 is a vehicle dispatch device that dispatches a plurality of vehicles 1.

User terminal 3 is a terminal operated by user 4 who uses a vehicle dispatch service and is, for example, a smartphone, a personal computer (PC), a wearable terminal, or the like.

By operating user terminal 3, user 4 can request dispatch of vehicle 1. Specifically, user 4 requests dispatch of vehicle 1 by inputting, to user terminal 3, a vehicle dispatch location desired by user 4, vehicle dispatch time desired by user 4, and a destination of vehicle 1.

Figure 2:
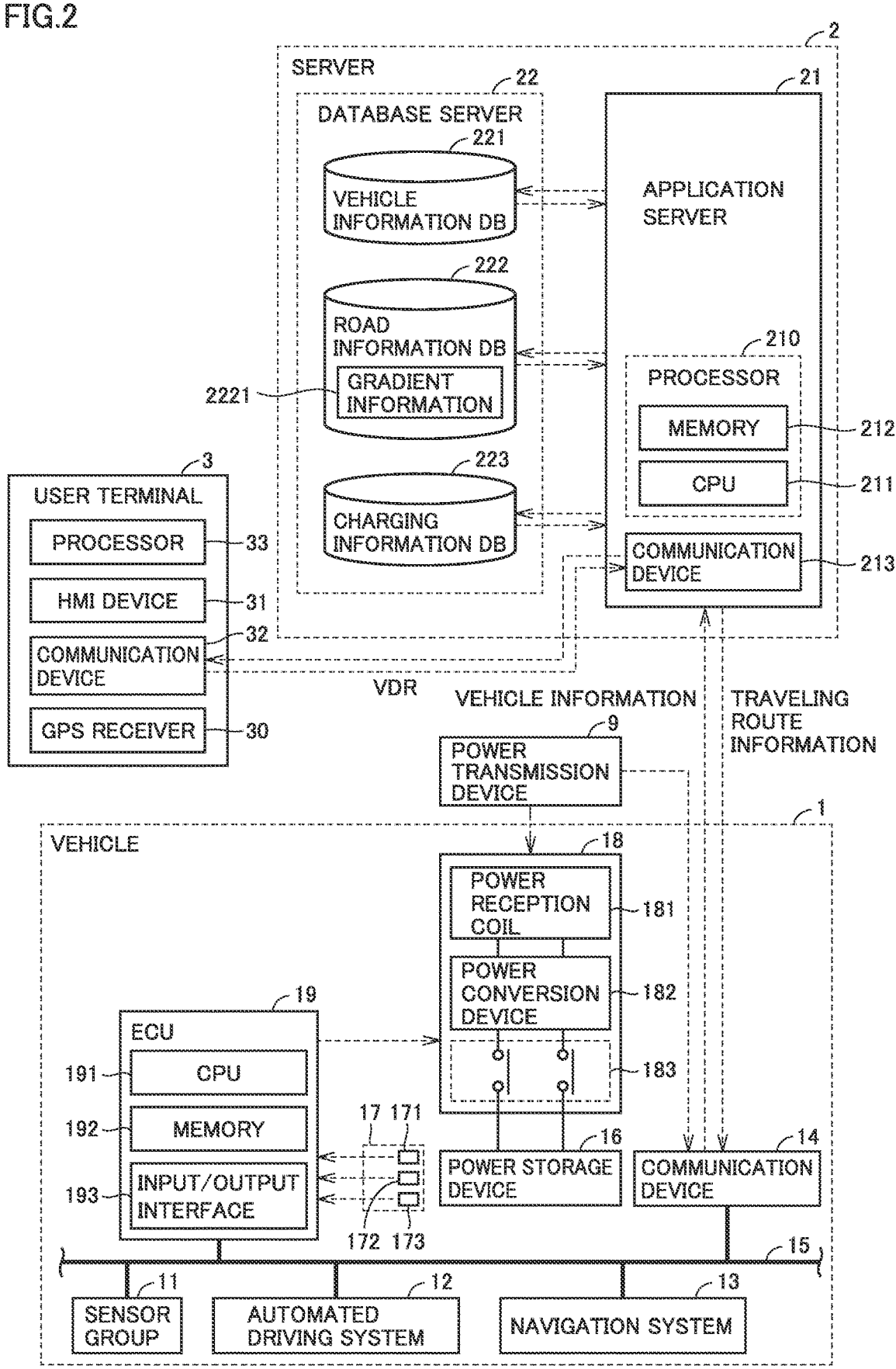
FIG. 2 is a diagram specifically showing configurations of a vehicle, a user terminal, and a server.

FIG. 2 is a diagram specifically showing configurations of vehicle 1, user terminal 3, and server 2. Vehicle 1 includes a sensor group 11, an automated driving system 12, a navigation system 13, a power storage device 16, a monitoring unit 17, a power reception device 18, a communication device 14, and an electronic control unit (ECU) 19. Automated driving system 12, navigation system 13, communication device 14, and ECU 19 are configured to communicate with each other via a vehicle-mounted network 15 such as a controller area network (CAN).

Sensor group 11 detects: conditions outside vehicle 1; information depending on the traveling state of vehicle 1 (for example, a vehicle speed); presence or absence of an occupant in vehicle 1; and an operation (a steering operation, an accelerator operation, and a brake operation) of vehicle 1. The sensor group may include, for example, a camera, a radar, a laser imaging detection and ranging (LIDAR), a vehicle speed sensor, an acceleration sensor, and a gyro sensor (none of which is shown). The result of detection by sensor group 11 is output to vehicle-mounted network 15.

Based on inputs from sensor group 11, automated driving system 12 performs various control operations (lane keeping control, navigation control, vehicle-stop control, and the like) for allowing automated driving of vehicle 1 in cooperation with an ECU 19 (described later). This enables automated driving of vehicle 1. Thus, a driver of vehicle 1 is not necessarily required for dispatching vehicle 1 (for picking up user 4).

Navigation system 13 guides vehicle 1 through the traveling route. Navigation system 13 includes a global positioning system (GPS) receiver and a display equipped with a touch panel (none of which is shown). The GPS receiver locates the position of the current location of vehicle 1 based on radio waves from an artificial satellite (not shown). The position information (GPS information) indicating the position of the current location of vehicle 1 is used for a process of determining the traveling route of vehicle 1 (which will be described later in detail). The display shows the current location and the destination of vehicle 1 on a road map at and around the current location of vehicle 1.

Power storage device 16 is a power storage component that stores electric power for traveling. Power storage device 16 is configured to include, for example, a secondary battery such as a lithium-ion battery or a nickel-metal hydride battery, and a power storage element such as an electric double layer capacitor. A state of charge (SOC) of power storage device 16 is used as an example of an index value representing the amount of power storage in power storage device 16. The index value may be an open circuit voltage (OCV) of power storage device 16.

Monitoring unit 17 includes a voltage sensor 171, a current sensor 172, and a temperature sensor 173. Voltage sensor 171, current sensor 172, and temperature sensor 173 detect the voltage, the current, and the temperature, respectively, of power storage device 16. Monitoring unit 17 is provided for monitoring the state of power storage device 16 (specifically, for calculating the SOC).

Power reception device 18 includes a power reception coil 181, a power conversion device 182, and a relay 183. Power reception coil 181 wirelessly receives alternating-current (AC) power from a wireless-type power transmission device 9 (described later in detail) provided external to vehicle 1.

Power conversion device 182 converts the AC power received by power reception coil 181 into direct-current (DC) power at the voltage level of power storage device 16. A power line connected to an input terminal of power conversion device 182 is provided with a voltage sensor and a current sensor (both are not shown) for calculating AC power (received electric power) received by power reception coil 181.

Relay 183 is provided between power conversion device 182 and power storage device 16. Power storage device 16 is charged when power conversion device 182 is activated and relay 183 is controlled to be closed while power reception coil 181 receives electric power. Hereinafter, charging of power storage device 16 using the electric power received by power reception coil 181 and supplied to power storage device 16 through power conversion device 182 and relay 183 will also be referred to as "wireless charging" of vehicle 1.

Communication device 14 is configured to enable bidirectional communication between vehicle 1 and server 2. Communication device 14 transmits vehicle information representing various pieces of information of vehicle 1 to server 2. The vehicle information includes, for example, position information (GPS information) indicating the current location of vehicle 1, SOC information indicating the current SOC of power storage device 16, a vehicle speed of vehicle 1, a vehicle type, average rate of the travel distance of vehicle 1 relative to power consumption in power storage device 16, which depends on the vehicle type, and various sensor values. Further, communication device 14 is configured to enable short-range communication between vehicle 1 and power transmission device 9. As an example, from power transmission device 9, communication device 14 receives a signal indicating that wireless charging can be performed.

ECU 19 includes a central processing unit (CPU) 191, a memory 192, and an input/output interface 193. CPU 191 executes programs and data stored in memory 192. Input/output interface 193 is configured to acquire information to be transmitted to vehicle-mounted network 15 and to output information indicating a result of execution of the program by CPU 191 to vehicle-mounted network 15. In accordance with the detection values of sensor group 11 and monitoring unit 17 and the program stored in memory 192, ECU 19 calculates the SOC of power storage device 16 or controls each device (for example, communication device 14 and power reception device 18) of vehicle 1.

Vehicle 1 further includes a motor generator (MG), a power control unit (PCU), and driving wheels (none of which is shown). The MG is driven by the PCU to generate rotational driving force. The driving force generated by the MG is transmitted to the driving wheels. This causes vehicle 1 to travel. During regenerative braking of vehicle 1, the MG can generate electric power by the rotational force from the driving wheels (regenerative power generation). The electric power generated by regenerative power generation is supplied through the PCU to power storage device 16 for charging.

Vehicle 1 further includes an inlet (not shown). The inlet is configured to be connectable to a connector of a charging cable extending from a contact-type charging facility such as a charging station. The inlet receives electric power from a contact-type charging facility through the charging cable. The electric power received by the inlet is supplied to power storage device 16 for charging. Hereinafter, charging of power storage device 16 using the electric power received by the inlet will also be referred to as "contact charging" of vehicle 1.

User terminal 3 includes a GPS receiver 30, an HMI device 31, a communication device 32, and a processor 33. GPS receiver 30 is configured to specify the current location of user terminal 3 (the vehicle dispatch location of vehicle 1).

HMI device 31 includes an input device and a display device (none of which is shown). The input device receives a user operation for a vehicle dispatch request VDR indicating that user 4 requests dispatch of vehicle 1. Vehicle dispatch request VDR includes information indicating a vehicle dispatch location, vehicle dispatch time, and a destination about vehicle 1. The vehicle dispatch location of vehicle 1 may be input by user 4 or may be automatically specified by GPS receiver 30. The display device shows a screen for a user operation.

Communication device 32 is an interface for wireless communication with server 2. For example, when the input device of HMI device 31 receives a user operation for requesting dispatch of vehicle 1, communication device 32 transmits vehicle dispatch request VDR to server 2.

Processor 33 incorporates a CPU and a memory (none of which is shown). Processor 33 controls each device (HMI device 31 and communication device 32) of user terminal 3 in accordance with the information stored in the memory and the information input to HMI device 31.

Server 2 includes an application server 21 and a database server 22. Application server 21 includes a communication device 213 and a processor 210.

Communication device 213 acquires (receives) vehicle dispatch request VDR from user terminal 3, or receives the above-mentioned vehicle information from vehicle 1. The vehicle information is collected for each vehicle 1 by processor 210. Communication device 213 forms an example of the "acquisition device" of the present disclosure.

Processor 210 includes a CPU 211 and a memory 212. CPU 211 is configured to execute a program stored in memory 212. Memory 212 stores a program to be executed by CPU 211 or temporarily stores data received by communication device 213 from vehicle 1.

When communication device 213 acquires vehicle dispatch request VDR, processor 210 determines a traveling route of vehicle 1 based on the current location, the vehicle dispatch location, and the destination of vehicle 1, and a road information database 222 (which will be described later). Specifically, in accordance with vehicle dispatch request VDR, processor 210 determines the traveling route of vehicle 1 from the current location of vehicle 1 via the vehicle dispatch location to the destination Processor 210 transmits the determined traveling route to vehicle 1 through communication device 213.

Database server 22 includes a vehicle information database (DB) 221, a road information database (DB) 222, and a charging information database (DB) 223. Vehicle information database 221 stores vehicle information collected for each vehicle 1.

Road information database 222 stores road information that represents information of various roads and this information includes map data. Road information database 222 includes gradient information 2221. Gradient information 2221 indicates an uphill gradient of each road stored in road information database 222.

Charging information database 223 stores information indicating: specifications (for example, electric power to be transmitted) of power transmission device 9; a predicted value of power reception efficiency of power reception device 18 during wireless charging by power transmission device 9; an average number of uses of power transmission device 9 per day; and an installation position of power transmission device 9.

The power reception efficiency represents a ratio of the electric power received by power reception device 18 relative to the electric power transmitted from power transmission device 9. Depending on the types of the power reception coil and the power transmission coil (specifically, the shapes of these coils, the direction of winding, and the shape of the magnetic core), it varies whether distribution of magnetic flux generated from the power transmission coil for wireless charging is suitable or not for the power reception coil to receive electric power (whether or not the power reception coil and the power transmission coil are well compatible with each other). Thus, the estimated value of the power reception efficiency is determined in advance as appropriate by experiments and the like for each combination of the type of power reception device 18 and the type of power transmission device 9. In this way, in charging information database 223, the estimated value of the power reception efficiency of power reception device 18 during wireless charging by power transmission device 9 is stored in association with power transmission device 9.

Pieces of information stored in vehicle information database 221, road information database 222, and charging information database 223 are sequentially updated by processor 210.

Figure 3:
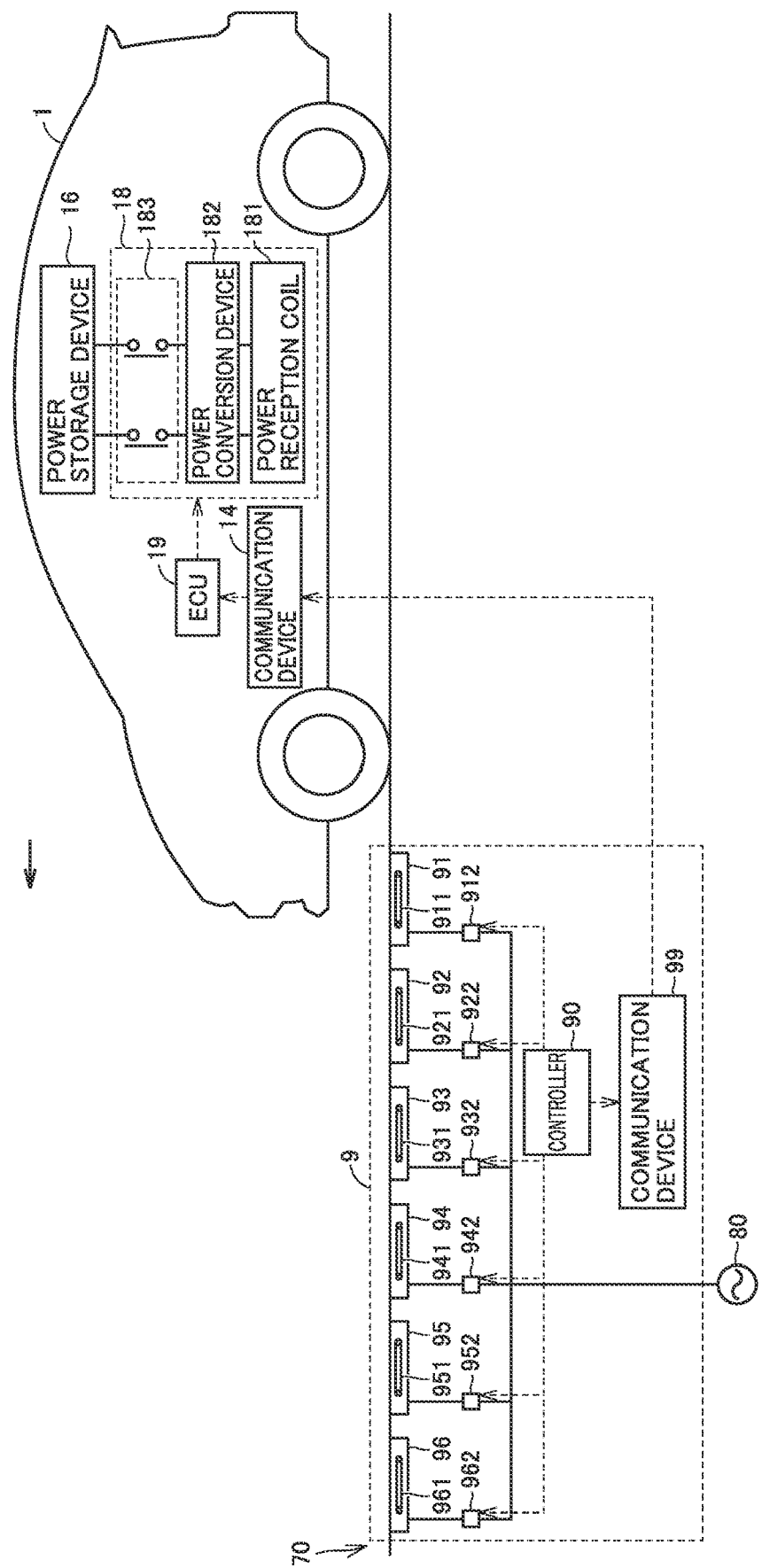
FIG. 3 is a diagram specifically showing an example of a configuration of a power transmission device according to an embodiment.

FIG. 3 is a diagram specifically showing an example of the configuration of power transmission device 9 according to the present embodiment. Power transmission device 9 is installed in a charging lane 70 on which vehicle 1 travels for performing wireless charging.

Power transmission device 9 is configured to wirelessly transmit electric power to power reception device 18. Power transmission device 9 includes power transmission units 91 to 96, power supply circuits 912, 922, 932, 942, 952, and 962, a controller 90, and a communication device 99.

Power transmission units 91 to 96 are arranged in a line. Power transmission units 91, 92, 93, 94, 95, and 96 include power transmission coils 911, 921, 931, 941, 951, and 961, respectively. Power transmission units 91 to 96 each further include a detector (not shown) for detecting passage of vehicle 1. These detectors include optical sensors, weight sensors, and the like. Power transmission units 91 to 96 are provided below charging lane 70 in the example shown in FIG. 3, but may be provided on a sidewall of charging lane 70. FIG. 3 shows six power transmission units 91 to 96, but the number of power transmission units is not limited.

Power supply circuits 912, 922, 932, 942, 952, and 962 are connected to power transmission units 91, 92, 93, 94, 95, and 96, respectively. The power supply circuits each convert AC power from an AC power supply 80 such as a commercial power supply into AC power having different voltage levels. Each converted AC power is supplied to a corresponding one of the power transmission units.

In accordance with the detection signal from each detector, controller 90 locates the position on which vehicle 1 travels. Then, controller 90 performs control to supply electric power from AC power supply 80 to a power transmission coil in a power transmission unit, above which vehicle 1 is located, among power transmission units 91 to 96. Specifically, controller 90 controls the power supply circuit connected to the power transmission coil in this power transmission unit such that AC power is supplied to the power transmission coil from this power supply circuit.

For example, when vehicle 1 is detected above power transmission unit 91, the AC power converted by power supply circuit 912 is supplied to power transmission coil 911. Thus, an alternating current flows through power transmission coil 911 to thereby form an electromagnetic field around power transmission coil 911. Power reception coil 181 in power reception device 18 of vehicle 1 wirelessly receives electric power through the electromagnetic field while vehicle 1 is traveling on charging lane 70. Then, when vehicle 1 is no longer detected above power transmission unit 91, controller 90 controls power supply circuit 912 to stop supply of AC power to power transmission coil 911. Controller 90 performs such control for each of power transmission units 91 to 96. Thereby, during traveling of vehicle 1, power storage device 16 is charged using the electric power received by power reception device 18.

Communication device 99 is provided to enable short-range communication between power transmission device 9 and vehicle 1. As an example, in accordance with an instruction from controller 90, communication device 99 transmits, to vehicle 1, a signal indicating a situation that wireless charging can be performed (for example, a situation that vehicle 1 is traveling on charging lane 70).

Figure 4:
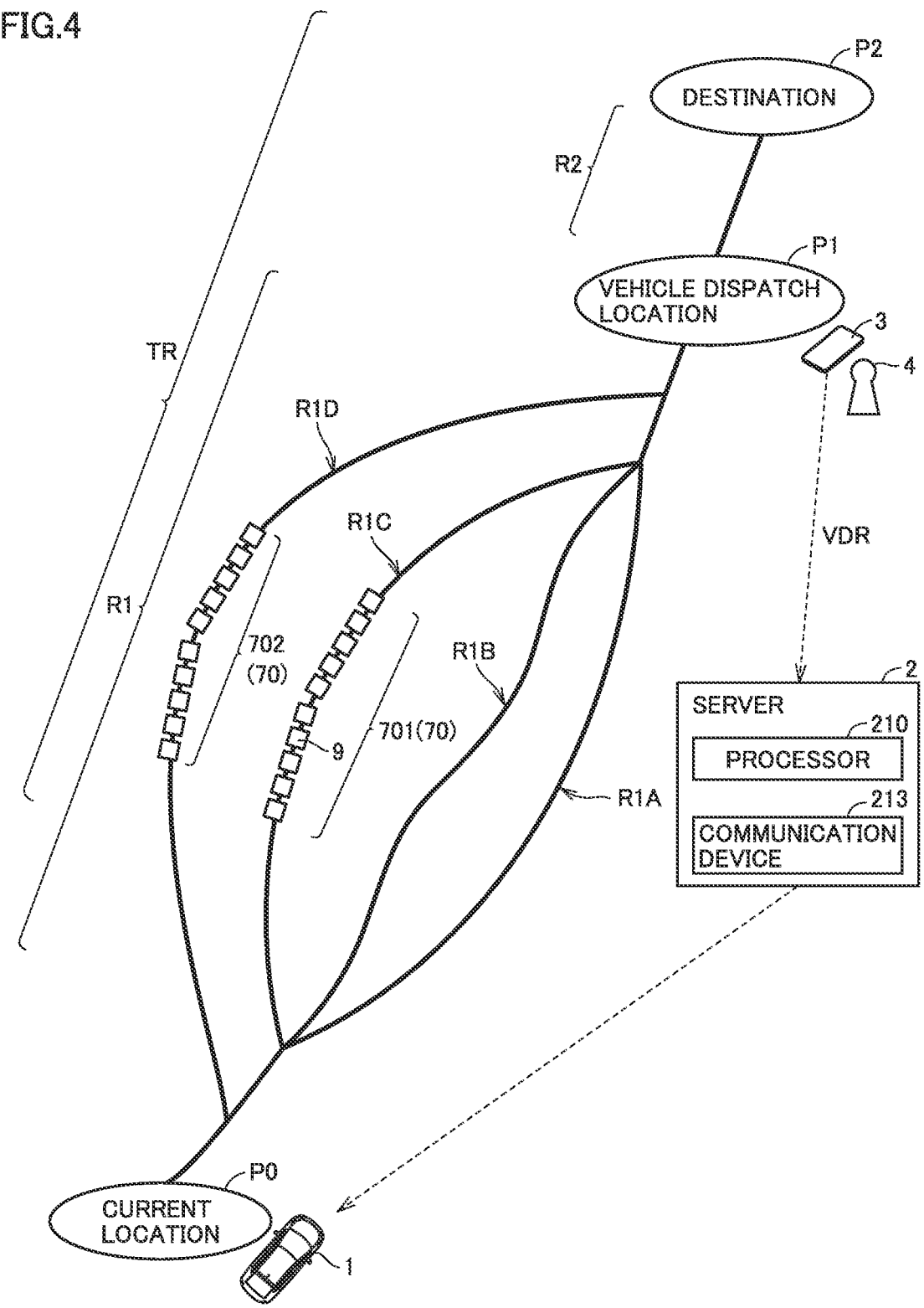
FIG. 4 is a diagram for illustrating an example of a method of determining a traveling route of the vehicle according to the embodiment.

FIG. 4 is a diagram for illustrating an example of a method of determining a traveling route of vehicle 1 according to the present embodiment. The following description refers to FIGS. 2 and 3 as appropriate.

As described below, processor 210 of server 2 determines whether vehicle 1 is remained or not as the above-mentioned candidate vehicle. Although one vehicle 1 is shown in the present example for simplicity of description, each of a plurality of vehicles 1 located within a range of a prescribed distance from user 4 is assumed to be vehicle 1 as a processing target to be determined whether to be remained or not as a candidate vehicle. In other words, this determination is made for each vehicle 1 located within the above-mentioned range. When two or more vehicles 1 are remained as candidate vehicles at the completion of the determination for each of all vehicles 1 located within the above-mentioned range, processor 210 determines, for example, a vehicle 1 closest to a vehicle dispatch location P1 among these two or more vehicles 1 as an electrically powered vehicle to be dispatched to the user (a dispatch vehicle).

When communication device 213 acquires vehicle dispatch request VDR from user terminal 3, processor 210 determines a traveling route TR for vehicle 1. Traveling route TR is a route along which vehicle 1 travels from a current location P0 of vehicle 1 via vehicle dispatch location P1 to a destination P2. Current location P0 is a position of vehicle 1 located when communication device 213 acquires vehicle dispatch request VDR and is, for example, a vehicle parking space.

Traveling route TR includes a route R1 and a route R2. Route R1 is a dispatch route of vehicle 1 from current location P0 to vehicle dispatch location (the location at which a user gets into a vehicle) P1. In the present example, four routes R1A to R1D are shown as candidates for route R1. Route R1B is the shortest in length as compared with other routes R1A, R1C, and R1D. Route R2 extends from vehicle dispatch location P1 to destination P2.

When vehicle 1 arrives at vehicle dispatch location P1, user 4 gets into vehicle 1 at vehicle dispatch location P1. Then, vehicle 1 travels from vehicle dispatch location P1 to destination P2 along route R2.

Routes R1A and R1B each are not provided with charging lane 70. The uphill gradient of the road in route R1A is smaller than the uphill gradient of the road in each of other routes R1B to R1D. Specifically, in road information DB 222, each of routes R1A to R1D is divided into a plurality of mesh-like sections. For each of routes R1A to R1D, the sum of the height differences, each of which is a difference between a start point and an end point of each section having an uphill gradient among the sections, is used as a gradient index value indicating the degree of the uphill gradient of the corresponding route. In the present example, the gradient index value of route R1A is smaller than the gradient index value of each of other routes R1B to R1D. In other words, among the roads in routes R1A to R1D, the road in route R1A has the most gradual uphill gradient. The gradient index value is stored in road information DB 222 as gradient information 2221.

Routes R1C and R1D are provided with charging lanes 701 and 702, respectively. Charging lanes 701 and 702 each correspond to charging lane 70 in FIG. 3. Route R1C is shorter in length than route R1D.

In accordance with the amount of power storage in power storage device 16 of vehicle 1 (the amount of power storage in power storage device 16 at current location P0) that is obtained when communication device 213 acquires vehicle dispatch request VDR, processor 210 of server 2 can determine whether or not to exclude vehicle 1 from candidates for the vehicle to be dispatched to user 4 (candidate vehicles), which will be hereinafter described in detail.

Processor 210 acquires the rate of the travel distance of vehicle 1 relative to power consumption in power storage device 16 from vehicle information DB 221, and also acquires the distance between current location P0 and vehicle dispatch location P1 from road information DB 222. Processor 210 divides the distance by the rate of the travel distance of vehicle 1 to thereby estimate the amount of power consumption in power storage device 16 that is consumed during traveling of vehicle 1 along the length of this distance. Processor 210 subtracts the above-mentioned amount of power consumption from the amount of power storage in power storage device 16 at current location P0 (indicated by the vehicle information) to thereby estimate the amount of power storage in power storage device 16 at vehicle dispatch location P1.

Processor 210 determines whether or not the amount of power storage that is estimated as the amount of power storage at vehicle dispatch location P1 is larger than the amount of electric power with which vehicle 1 can travel from vehicle dispatch location P1 to destination P2 (the threshold amount). From road information DB 222, processor 210 acquires the distance between vehicle dispatch location P1 and destination P2, and then, divides this distance by the rate of the travel distance of vehicle 1 relative to power consumption to thereby estimate (calculate) the above-mentioned threshold amount.

When the estimated amount of power storage is larger than the threshold amount, processor 210 determines that vehicle 1 can travel from current location P0 via vehicle dispatch location P1 to destination P2, and then, sets vehicle 1 to be remained as a candidate vehicle.

On the other hand, when the above-mentioned estimated amount of power storage is equal to or less than the threshold amount, it seems preferable that processor 210 determines that vehicle 1 cannot travel to destination P2 after it arrives at vehicle dispatch location P1, and thus, excludes vehicle 1 from the candidate vehicles. However, as the number of vehicles 1 excluded from the candidate vehicles is larger, the range for selection of vehicle 1 as a dispatch vehicle becomes narrower.

For example, among the plurality of vehicles 1 located within the range of the prescribed distance from user 4 (vehicle dispatch location P1), vehicle 1 closest to user 4 (the first vehicle) may be excluded from the candidate vehicles, or vehicle 1 farthest from the first user (the second vehicle) may be dispatched to user 4. In this case, even when the second user closer to the second vehicle than the first user requests dispatch of a vehicle while the second vehicle is being dispatched to the first user, the second vehicle is not dispatched to the second user. Thus, since the number of candidate vehicles for the second user decreases, there is a possibility that another vehicle 1 cannot be dispatched to the second user by the vehicle dispatch time desired by the second user. As a result, the vehicle dispatch efficiency in vehicle dispatch system 100 decreases.

Server 2 as the route determination device according to the present embodiment has a configuration for solving the above-described problem. Specifically, when communication device 213 acquires vehicle dispatch request VDR, processor 210 determines route R1 such that the amount of power storage in power storage device 16 at vehicle dispatch location P1 is larger than the above-mentioned threshold amount.

Thus, even when the amount of power storage in the power storage device is low, vehicle 1 can travel without requiring charging of power storage device 16 in the middle of the route from vehicle dispatch location P1 to destination P2 after it arrives at vehicle dispatch location P1 via route R1. This avoids such a situation that vehicle 1 is excluded from candidate vehicles. As a result, the vehicle dispatch efficiency can be improved when user 4 requests dispatch of vehicle 1.

Processor 210 may first determine a route that satisfies a default condition for route R1 included in traveling route TR. As an example, the default condition defines that the route from current location P0 to vehicle dispatch location P1 is the shortest in length. In the present example, among four routes R1A to R1D, route R1B satisfies this condition. Thus, route R1B is first determined as route R1.

It is assumed that vehicle 1 travels along route R1B from current location P0 to vehicle dispatch location P1. Processor 210 estimates the amount of power storage in power storage device 16 at vehicle dispatch location P1 in this case. Specifically, processor 210 subtracts the amount of power consumption in power storage device 16 that is consumed during traveling of vehicle 1 on route R1B from the amount of power storage in power storage device 16 at current location P0, to thereby estimate the amount of power storage in power storage device 16 at vehicle dispatch location P1. Processor 210 acquires the length of route R1B from road information DB 222, and divides the length by the rate of the travel distance of vehicle 1 relative to power consumption to thereby calculate the amount of power consumption.

When the estimated amount of power storage as the amount of power storage in power storage device 16 at vehicle dispatch location P1 is less than the threshold amount, processor 210 preferably modifies route R1 to be changed from route R1B such that the amount of power storage at vehicle dispatch location P1 is larger than the threshold amount.

Thus, even when the amount of power storage in power storage device 16 at current location P0 is low at the point in time when communication device 213 acquires vehicle dispatch request VDR, the amount of power storage at vehicle dispatch location P1 (the amount of power storage that is stored when vehicle 1 actually arrives at vehicle dispatch location P1) can be set to be larger than the threshold amount. Specifically, even when the amount of power storage in power storage device 16 is so low at the above-mentioned point in time that vehicle 1 cannot travel from vehicle dispatch location P1 to destination P2 after arriving at vehicle dispatch location P1 from current location P0, the amount of power storage at vehicle dispatch location P1 can be set to be larger than the threshold amount.

In the present embodiment, processor 210 determines (modifies) route R1 such that route R1 includes a route on which charging lane 70 is installed in order to set the amount of power storage at vehicle dispatch location P1 to be larger than the threshold amount. In the present example, it is assumed that the amount of power storage at vehicle dispatch location P1 becomes equal to or greater than the threshold amount when vehicle 1 travels along route R1C, whereas the amount of power storage at vehicle dispatch location P1 does not become equal to or greater than the threshold amount even when vehicle 1 travels along route R1D. Thus, when processor 210 modifies route R1B determined in accordance with the default condition, processor 210 modifies route R1 to be changed from route R1B to route R1C.

Since route R1 is determined (modified) to be route R1C as described above, power storage device 16 is charged while vehicle 1 is traveling along charging lane 70 (701). Thus, vehicle 1 does not need to stop in the middle of the route from current location P0 to vehicle dispatch location P1 for the purpose of using a charging facility such as a charging station. Accordingly, vehicle 1 can arrive at vehicle dispatch location P1 earlier than when it uses a charging facility such as a charging station. Thereby, vehicle 1 can readily reach vehicle dispatch location P1 by the vehicle dispatch time desired by user 4.

Vehicle 1 performs wireless charging during traveling along charging lane 70. Thus, even when a contact-type charging facility (a charging spot) is provided along route R1 (any one of routes R1A to R1D), vehicle 1 does not necessarily have to stop to use the charging facility for charging power storage device 16. Thus, wireless charging during traveling of vehicle 1 along charging lane 70 is particularly effective when such a charging facility is congested.

Processor 210 may determine route R1 such that the estimated value of the power reception efficiency of power reception device 18 (during wireless charging of vehicle 1) that is obtained when the electric power received by power reception device 18 is stored in power storage device 16 is equal to or greater than a prescribed threshold efficiency. In the present example, among routes R1C and R1D, processor 210 determines, as route R1, a route along which the estimated value of the power reception efficiency is equal to or greater than the threshold efficiency.

Specifically, from charging information DB 223, processor 210 acquires the estimated value of the power reception efficiency associated with power transmission device 9 in charging lane 70 provided in each of these routes. Processor 210 compares the estimated value of the power reception efficiency with the threshold efficiency for each of routes R1C and R1D. In the example in FIG. 4, it is assumed that the estimated value of the power reception efficiency for power transmission device 9 on charging lane 701 is equal to or greater than the threshold efficiency, while the estimated value of the power reception efficiency for power transmission device 9 on charging lane 702 is less than the threshold efficiency. Thus, route R1C is determined as route R1. This prevents the vehicle from traveling along charging lane 70 (702) that unnecessarily lowers the power reception efficiency of power reception device 18. As a result, power loss occurring during wireless charging can be reduced.

When vehicle 1 runs by unmanned traveling from current location P0 to vehicle dispatch location P1, it is particularly effective for processor 210 to determine route R1 such that the amount of power storage in power storage device 16 at vehicle dispatch location P1 is larger than the threshold amount. Specifically, during unmanned driving of vehicle 1, no problem arises in drivability of vehicle 1. Thus, processor 210 can determine route R1 irrespective of the quality of the drivability as long as vehicle 1 can arrive at vehicle dispatch location P1 before the vehicle dispatch time desired by user 4. This can avoid such a situation that the range for selection of route R1 is narrowed for prevention of deterioration in drivability.

For example, even if processor 210 determines route R1C as route R1 when route R1C includes what is called a rough road (an off-road route), no problem arises from the viewpoint of drivability. In other words, processor 210 does not need to exclude route R1C from route R1 for prevention of deterioration in drivability. Alternatively, as long as vehicle 1 can arrive at vehicle dispatch location P1 before the vehicle dispatch time, no problem arises even when processor 210 reduces the speed at which vehicle 1 travels along route R1C or stops vehicle 1 in the middle of route R1C.

Figure 5:
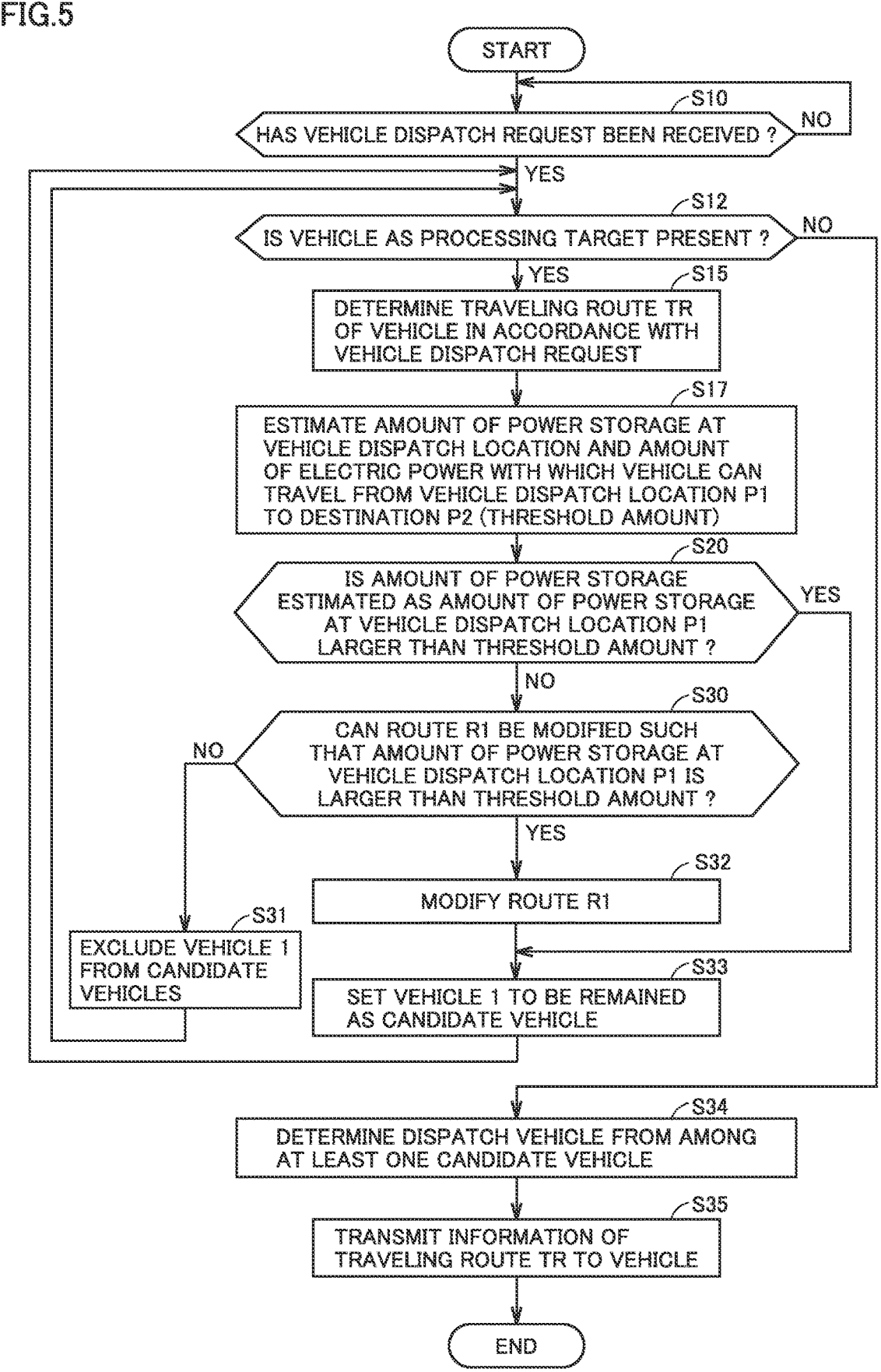
FIG. 5 is a diagram showing an example of a process performed by a processor of the server according to the embodiment.

FIG. 5 is a diagram showing an example of a process performed by processor 210 of server 2 in the present embodiment. This flowchart is performed at prescribed time intervals during the operation of server 2.

Referring to FIG. 5, processor 210 determines whether or not communication device 213 has acquired (received) vehicle dispatch request VDR from user terminal 3 (step S10). Vehicle dispatch request VDR includes information indicating vehicle dispatch location P1 and destination P2. When processor 210 has not received vehicle dispatch request VDR (NO in step S10), processor 210 performs the above-mentioned determination process until processor 210 receives vehicle dispatch request VDR. When processor 210 has received vehicle dispatch request VDR (YES in step S10), processor 210 shifts the process to step S12.

Then, processor 210 determines whether vehicle 1 as a processing target is present or not (step S12). Vehicle 1 as a processing target is selected, for example, from among a plurality of vehicles 1 located within a range of a prescribed distance from vehicle dispatch location P1. In the present example, it is assumed that at least one vehicle 1 as a processing target is present, and at least one candidate vehicle is present among the at least one vehicle 1 as a processing target. As an example, vehicle 1 as the first processing target is vehicle 1 closest to vehicle dispatch location P1 among the plurality of vehicles 1 located within the above-mentioned range. The process performed when vehicle 1 as a processing target is no longer present (NO in step S12) will be described later. On the other hand, when vehicle 1 as a processing target is present (YES in step S12), processor 210 shifts the process to step S15.

Then, processor 210 determines traveling route TR of vehicle 1 in accordance with road information DB 222 (FIG. 2) and the vehicle dispatch request (step S15). In the present example, among routes R1A to R1D, route R1B satisfying the above-mentioned default condition is first determined as route R1 of traveling route TR. This condition defines that route R1 is the shortest in length.

Then, processor 210 estimates the amount of power storage at vehicle dispatch location P1 and the amount of electric power with which vehicle 1 can travel from vehicle dispatch location P1 to destination P2 (the threshold amount) (step S17).

Then, processor 210 determines whether or not the amount of power storage estimated as the amount of power storage at vehicle dispatch location P1 is larger than the threshold amount (step S20). When the estimated amount of power storage is larger than the threshold amount (YES in step S20), processor 210 shifts the process to step S33.

On the other hand, when the estimated amount of power storage is equal to or less than the threshold amount (NO in step S20), processor 210 shifts the process to step S30 Then, processor 210 determines whether route R1 can be modified or not such that the amount of power storage at vehicle dispatch location P1 is larger than the threshold amount (step S30).

When route R1 cannot be modified (NO in step S30), processor 210 excludes vehicle 1 from the candidate vehicles (step S31). The state that route R1 cannot be modified corresponds to, for example, the state that, even when vehicle 1 travels along route R1C or route R1D, the amount of power storage in power storage device 16 at vehicle dispatch location P1 cannot be increased to be equal to or greater than the threshold amount by the vehicle dispatch time. After the process in step S31, processor 210 changes vehicle 1 as a processing target, and returns the process to step S12.

On the other hand, when route R1 can be modified in step S30 (YES in step S30), processor 210 modifies route R1 such that the amount of power storage at vehicle dispatch location P1 is larger than the threshold amount (step S32), and sets vehicle 1 to be remained as a candidate vehicle (step S33). Then, processor 210 changes vehicle 1 as a processing target, and returns the process to step S12.

Thereafter, processor 210 performs the processes of steps S15 to S33 until it is determined in step S12 that vehicle 1 as a processing target is no longer present (until the process branches to NO in step S12). Vehicle 1 for which these processes have been performed once is then excluded from the vehicles as processing targets.

When it is determined in step S12 that vehicle 1 as a processing target is no longer present (NO in step S12), processor 210 determines a dispatch vehicle from at least one candidate vehicle (step S34). When two or more vehicles 1 are remained as candidate vehicles, processor 210 determines, for example, vehicle 1 closest to vehicle dispatch location P1 among these two or more vehicles 1 as a dispatch vehicle.

After the process of step S34, processor 210 transmits information indicating traveling route TR of vehicle 1 determined as a dispatch vehicle through communication device 213 to this vehicle 1 (step S35). Route R1 of traveling route TR indicated by the information differs depending on the result as to how the process branches in step S20 for vehicle 1. Specifically, when the process branches to NO in step S20, route R1C is determined as route R1. On the other hand, when the process branches to YES in step S20, route R1B is determined as route R1. Vehicle 1 travels from current location P0 to vehicle dispatch location P1 along route R1 indicated by the information received from server 2. After the process of step S35, the series of processes ends.

In the above description, a processor 210 performs the processes of steps S15 to S33 until the process branches to NO in step S12. On the other hand, processor 210 may determine vehicle 1 as a processing target, for example, in ascending order of distance between vehicle dispatch location P1 and vehicle 1 among the plurality of vehicles 1 located within the range of the prescribed distance from vehicle dispatch location P1. In this case, at the point in time when processor 210 determines that vehicle 1 as a processing target can be remained as a candidate vehicle (YES in step S20 or YES in step S30), processor 230 may determine this vehicle 1 as a dispatch vehicle and transmit the information indicating traveling route TR to this vehicle 1.

As described above, when communication device 213 acquires vehicle dispatch request VDR, processor 210 of server 2 as the route determination device according to the present embodiment determines route R1 such that the amount of power storage in power storage device 16 at vehicle dispatch location P1 is larger than the above-mentioned threshold amount.

Thereby, even when the amount of power storage in power storage device 16 is low, vehicle 1 can travel to destination P2 without requiring charging of power storage device 16 in the middle of the route from vehicle dispatch location P1 to destination P2 after arriving at vehicle dispatch location P1 via route R1. This avoids such a situation that vehicle 1 is excluded from candidate vehicles. As a result, the vehicle dispatch efficiency can be improved when user 4 requests dispatch of vehicle 1.

[First Modification]

In the above-described embodiment, from power transmission device 9, power reception device 18 receives electric power obtained from AC power supply 80 such as a commercial power supply. By contrast, the present modification is different from the above-described embodiment in that power reception device 18 receives, from power transmission device 9, electric power generated using renewable energy.

The following describes the case in which renewable energy originates from sunlight by way of example, but renewable energy may originate from wind power, geothermal power, biomass, and the like.

Figure 6:
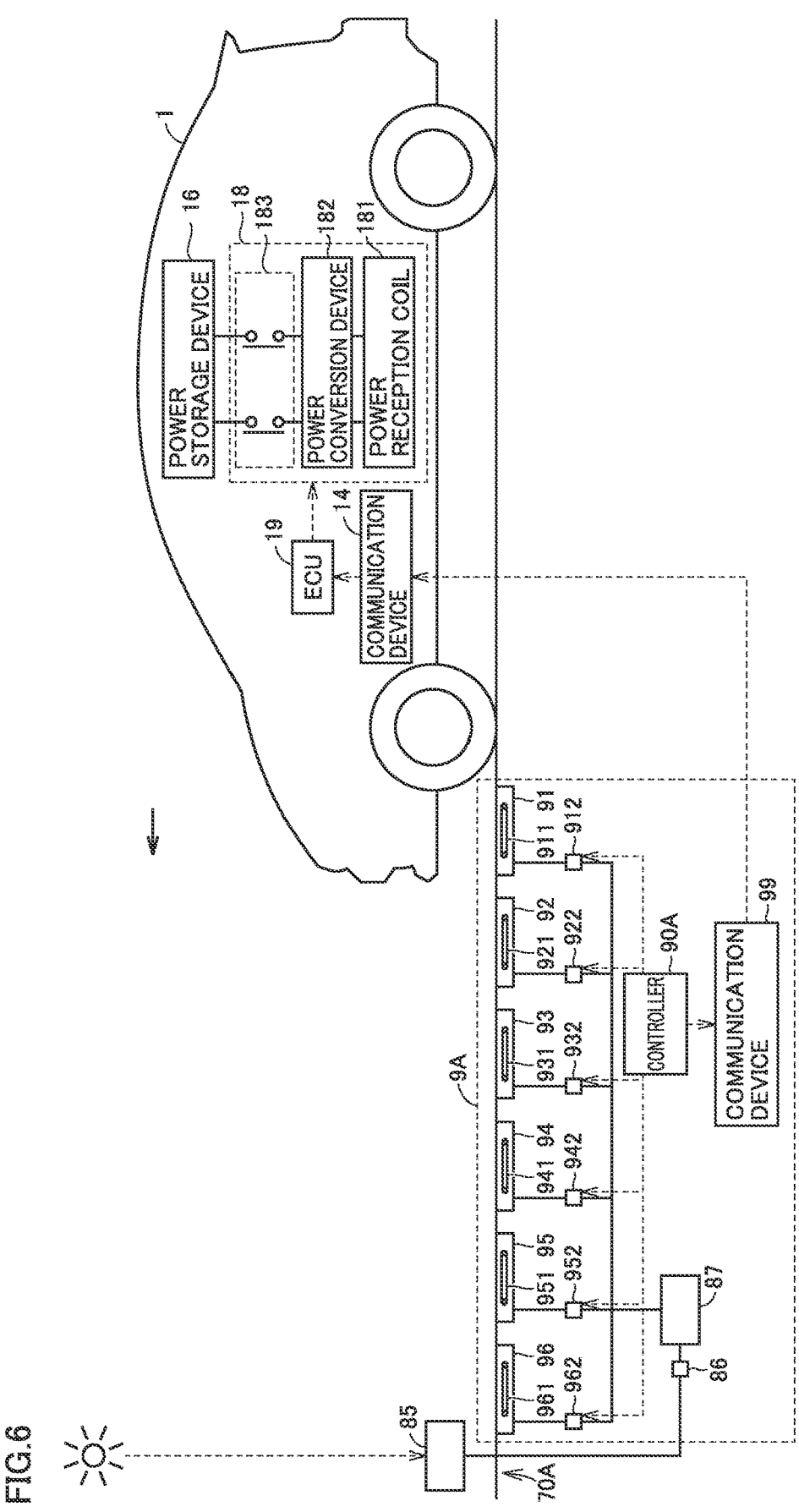
FIG. 6 is a diagram specifically showing an example of a configuration of a power transmission device according to a modification.

FIG. 6 is a diagram specially showing an example of the configuration of a power transmission device 9A according to the present modification. Power transmission device 9A is different from power transmission device 9 (FIG. 3) in that it includes a solar panel 85, a power conversion device 86, and a power storage device 87 in place of AC power supply 80.

Solar panel 85 is a solar cell that receives light energy from the sun to generate electric power. Specifically, solar panel 85 is configured to convert light energy into DC power and output the converted power to power conversion device 86 as generated electric power.

Power conversion device 86 converts the electric power generated by solar panel 85 into a DC current at the voltage level of power storage device 87.

Power storage device 87 is charged with the electric power converted by power conversion device 86. Power storage device 87 stores electric power to be input to each of power supply circuits 912, 922, 932, 942, 952, and 962.

From the viewpoint of global environment protection, devices that generate electric power using renewable energy (sunlight, wind power, geothermal heat, biomass, and the like) with low burden on the environment have become widespread. It is preferable that the motivation to use renewable energy is enhanced throughout the society.

Thus, when processor 210 of server 2 determines that power reception device 18 has received electric power generated using renewable energy (sunlight in the present example) from power transmission device 9A, processor 210 performs a process for giving an incentive point to user 4 of vehicle 1.

A signal indicating that the electric power received by power reception device 18 from power transmission device 9A is electric power generated using renewable energy is transmitted from communication device 99 to communication device 14.

This signal is received by ECU 19 through communication device 14 and then transmitted to server 2. Processor 210 of server 2 can perform the above-described determination process based on whether this signal has been received or not.

The following specifically describes the process performed by processor 210 to give an incentive point to user 4. In accordance with the detection values of the voltage sensor and the current sensor provided in the power line connected to the input terminal of power conversion device 182, ECU 19 of vehicle 1 calculates the amount of AC power wirelessly received by power reception coil 181. Then, ECU 19 transmits the calculation result to server 2 through communication device 14. When communication device 213 of server 2 receives the calculation result, processor 210 calculates an incentive point corresponding to the calculation result.

The incentive point is calculated, for example, depending on an amount of emitted greenhouse gas (for example, carbon dioxide) estimated to be reduced when vehicle 1 travels using the amount of AC power wirelessly received by power reception coil 181. Specifically, in accordance with the rate of the travel distance of vehicle 1 relative to power consumption, processor 210 calculates a distance in which vehicle 1 can travel using the amount of AC power. Then, processor 210 calculates the amount of emitted greenhouse gas estimated to be reduced if vehicle 1 travels this distance using fuel such as gasoline. This amount is calculated in accordance with a predetermined fuel efficiency as the fuel efficiency of a commonly used gasoline-powered vehicle. It is considered that the amount of reduction in greenhouse gas is larger as the amount estimated to be reduced is larger, and thus, a higher incentive point is calculated. By way of example, the incentive point is electronic money or a point given to user 4 as a benefit such as a discount in some shopping facilities.

Processor 210 transmits a signal indicating the incentive point calculated in this manner to user terminal 3 through communication device 213. When communication device 32 of user terminal 3 receives this signal, the CPU of processor 33 causes the incentive point to be stored in the memory of processor 33. Thereby, the incentive point is given to user 4. As a result, user 4 is motivated to use renewable energy.

Processor 210 may perform a process for giving an incentive point to user 4 of vehicle 1 in accordance with the average number of uses of power transmission device 9A per day. From charging information DB 223 (FIG. 2), processor 210 can acquire the average number of uses of power transmission device 9A per day.

As an example, processor 210 may perform a process for giving an incentive point to user 4 of vehicle 1 when power reception device 18 receives electric power generated using renewable energy from power transmission device 9A and it is determined that the average number of uses of power transmission device 9A per day is less than a prescribed number of uses.

Thereby, even when power transmission device 9A is not so frequently used as the above-mentioned number of uses of power transmission device 9A is less than the above-mentioned prescribed number of uses, user 4 is further motivated to use power transmission device 9A. Accordingly, deterioration resulting from non-use of power transmission device 9A can be suppressed.

[Second Modification]

In the above-described embodiment and the first modification thereof, wireless charging using charging lane 70 is performed during the time period by the time when vehicle 1 arrives at vehicle dispatch location P1 from current location P0. In contrast, during this time period, contact charging using a contact-type charging facility such as a charging station may be performed.

Referring again to FIG. 4, in the present second modification, a charging station is installed in a region in the vicinity of route R1A. The region in the vicinity of route R1A is located within a prescribed distance from route R1A. Thus, processor 210 may determine route R1A as route R1 such that a contact-type charging facility is located in the region in the vicinity of route R1.

Thereby, contact charging can be performed using a charging station or the like by the time when vehicle 1 arrives at vehicle dispatch location P1 from current location P0. Therefore, the amount of power storage in power storage device 16 at vehicle dispatch location P1 can be set to be equal to or greater than the threshold amount. As a result, even when congestion occurs in routes R1C and R1D, it is possible for vehicle 1 to set the amount of power storage in the power storage device at vehicle dispatch location P1 to be equal to or greater than the threshold amount while avoiding such congestion.

[Third Modification]

In accordance with gradient information 2221 indicating the uphill gradients of the roads in route R1, processor 210 may estimate the amount of power consumption in power storage device 16 that is consumed during traveling of vehicle 1 on route R1. Then, processor 210 may estimate the amount of power storage in power storage device 16 at vehicle dispatch location P1 in accordance with the estimated amount of power consumption and the amount of power storage in power storage device 16 at current location P0.

Specifically, processor 210 may determine (modify) route R1 such that route R1 includes a road with a relatively gradual uphill gradient in preference to a road with a relatively steep uphill gradient, which will be hereinafter described in detail.

Referring again to FIG. 4, among the roads in routes R1A to R1D, the road in route R1A has the most gradual uphill gradient, as described above. Typically, when vehicle 1 travels along a road with a relatively gradual uphill gradient, the amount of power consumption in power storage device 16 is smaller than that consumed when vehicle 1 travels along a road with a relatively steep uphill gradient. Thus, if vehicle 1 does not receive electric power from charging lane 701 or 702, the electric power consumed in power storage device 16 during traveling of vehicle 1 on route R1A is the least in amount as compared with the electric power consumed in power storage device 16 during traveling of vehicle 1 on each of other routes R1B to R1D.

Therefore, when the amount of power storage that is estimated as the amount of electric power stored when vehicle 1 arrives at vehicle dispatch location P1 from current location P0 via route R1A is equal to or greater than the threshold amount, processor 210 may determine route R1A as route R1.

Thereby, reduction in amount of power storage in power storage device 16 during traveling of vehicle 1 on route R1 is suppressed. As a result, the amount of power storage at the time when vehicle 1 arrives at vehicle dispatch location P1 via route R1A can be high. Thus, after vehicle 1 arrives at vehicle dispatch location P1, vehicle 1 can travel to destination P2 without requiring charging of power storage device 16 in the middle of the route from vehicle dispatch location P1 to destination P2.

The present modification is beneficial when user 4 needs to pay a fee for using charging lane 70 in routes R1C and R1D (or needs to pay a high fee exceeding a prescribed amount of money). Processor 210 may not necessarily have to determine, as route R1, route R1C or R1D along which charging lane 70 is provided. This can reduce the cost required for vehicle 1 to arrive at destination P2 from current location P0.

[Fourth Modification]

In the above-described embodiment and the first and second modifications thereof, vehicle 1 is defined as a BEV. Alternatively, vehicle 1 is not limited to a BEV but may be an electrically powered vehicle such as a plug-in hybrid electric vehicle (PHEV) further including an internal combustion engine. In such a case, vehicle 1 may be able to travel using only the electric power of power storage device 16 while the internal combustion engine is stopped (vehicle 1 can travel in what is called an EV mode). In the EV mode of vehicle 1, the above-mentioned first embodiment and the first and second modifications thereof may be applied as they are.

On the other hand, when vehicle 1 travels while the internal combustion engine is driven, processor 210 may determine (modify) traveling route TR including routes R1 and R2 based on the electric power generated by the MG during traveling of vehicle 1.

[Other Modifications]

In the above-described embodiment and the first to fourth modifications thereof, server 2 is used as an example of the route determination device of vehicle 1. Alternatively, the route determination device may be ECU 19 of vehicle 1.

Specifically, when ECU 19 functions as a route determination device, ECU 19 performs a series of processes shown in FIG. 5 as follows. ECU 19 determines whether vehicle dispatch request VDR made by user 4 using HMI device 31 of user terminal 3 has been acquired (received) or not through communication device 213 of server 2 and communication device 14 of vehicle 1 (corresponding to step S10). When vehicle dispatch request VDR has been acquired, ECU 19 performs the processes corresponding to steps S15 to S32 while accessing database server 22 through communication devices 14 and 213. When ECU 19 can determine (modify) route R1 such that the amount of power storage at vehicle dispatch location P1 is larger than the threshold amount (YES in step S20 or YES in step S30), vehicle 1 travels along route R1 to vehicle dispatch location P1.

Thus, when ECU 19 functions as a route determination device, CPU 191 of ECU 19 (FIG. 2) forms an example of the "processor" of the present disclosure, and input/output interface 193 of ECU 19 forms an example of the "acquisition device" of the present disclosure.

In the above-described embodiment, the default condition defines that the distance of the route from current location P0 to vehicle dispatch location P1 is the shortest in length, but is not limited thereto. The default condition may define that the amount of power storage at vehicle dispatch location P1 is larger than the threshold amount.

For example, among routes R1A to R1D in FIG. 4, route R1C satisfies the above-mentioned condition. Therefore, when communication device 213 acquires vehicle dispatch request VDR from user terminal 3, processor 230 determines route R1C satisfying the default condition as route R1.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A route determination device that determines a route of a vehicle that travels using electric power stored in a power storage device, the vehicle including a power reception device that wirelessly receives electric power from a power transmission device installed in a charging lane while the vehicle travels on the charging lane, the electric power received by the power reception device being stored in the power storage device, the route determination device comprising:
   a communication device that acquires, from a user terminal, a vehicle dispatch request including information indicating a vehicle dispatch location and a destination of the vehicle;
   a storage that stores, for each of a plurality of the charging lanes provided at a plurality of routes from a current location of the vehicle to the vehicle dispatch location, an estimated value of power reception efficiency of the power reception device that is achieved when the electric power received by the power reception device from the power transmission device of the charging lane is stored in the power storage device; and
   a processor that, when the communication device acquires the vehicle dispatch request, determines a traveling route of the vehicle from the current location via the vehicle dispatch location to the destination in accordance with the vehicle dispatch request, wherein
   the processor determines a vehicle dispatch route of the vehicle from the current location to the vehicle dispatch location from among the plurality of routes, such that an amount of power storage in the power storage device at the vehicle dispatch location is larger than an amount of electric power with which the vehicle is capable of traveling from the vehicle dispatch location to the destination,
   the processor determines the vehicle dispatch route from among the plurality of routes, such that the vehicle dispatch route includes a route on which the charging lane for which the estimated value is equal to or greater than a threshold efficiency out of the plurality of charging lanes is installed, and
   the processor dispatches the vehicle along the determined vehicle dispatch route.

2. The route determination device according to claim 1, wherein the processor performs a process for giving an incentive point to a user of the vehicle when the power reception device receives electric power generated using renewable energy from the power transmission device.

3. The route determination device according to claim 1, wherein
   when the communication device acquires the vehicle dispatch request,
   the processor
      determines the traveling route in accordance with the vehicle dispatch request,
      estimates the amount of power storage at the vehicle dispatch location and the amount of electric power, and
      when the estimated amount of power storage is smaller than the estimated amount of electric power, modifies the vehicle dispatch route such that the amount of power storage at the vehicle dispatch location is larger than the amount of electric power.

4. The route determination device according to claim 1, wherein
   the vehicle is capable of unmanned traveling, and
   the processor determines the vehicle dispatch route such that the amount of power storage at the vehicle dispatch location is larger than the amount of electric power when the vehicle performs unmanned traveling from the current location to the vehicle dispatch location.

5. The route determination device according to claim 1, wherein
   the processor
      estimates an amount of power consumption in the power storage device that is consumed during traveling of the vehicle on the vehicle dispatch route, in accordance with gradient information indicating gradients of roads of the vehicle dispatch route, and
      estimates an amount of power storage in the power storage device at the vehicle dispatch location in accordance with the estimated amount of power consumption and an amount of power storage in the power storage device at the current location.

6. A vehicle dispatch system comprising:
   a vehicle that travels using electric power stored in a power storage device; and
   a server that communicates with the vehicle and dispatches the vehicle, wherein
   the vehicle includes a power reception device that wirelessly receives electric power from a power transmission device installed in a charging lane while the vehicle travels on the charging lane, the electric power received by the power reception device being stored in the power storage device, and
   the server includes
      a communication device that, from a user terminal, acquires a vehicle dispatch request including information indicating a vehicle dispatch location and a destination of the vehicle,
      a storage that stores, for each of a plurality of the charging lanes provided at a plurality of routes from a current location of the vehicle to the vehicle dispatch location, an estimated value of power reception efficiency of the power reception device that is achieved when the electric power received by the power reception device from the power transmission device of the charging lane is stored in the power storage device, and
      a processor that, when the communication device acquires the vehicle dispatch request, determines a traveling route of the vehicle from the current location via the vehicle dispatch location to the destination in accordance with the vehicle dispatch request, and
   the processor determines a vehicle dispatch route of the vehicle from the current location to the vehicle dispatch location from among the plurality of routes, such that an amount of power storage in the power storage device at the vehicle dispatch location is larger than an amount of electric power with which the vehicle is capable of traveling from the vehicle dispatch location to the destination,
   the processor determines the vehicle dispatch route from among the plurality of routes, such that the vehicle dispatch route includes a route on which the charging lane for which the estimated value is equal to or greater than a threshold efficiency out of the plurality of charging lanes is installed, and the processor dispatches the vehicle along the determined vehicle dispatch route.

* * * * *